(12) United States Patent
Lai et al.

(10) Patent No.: US 9,994,151 B2
(45) Date of Patent: Jun. 12, 2018

(54) METHODS AND SYSTEMS FOR BLIND SPOT MONITORING WITH ADAPTIVE ALERT ZONE

(71) Applicants: Denso International America, Inc., Southfield, MI (US); DENSO CORPORATION, Kariya, Aichi-pref. (JP)

(72) Inventors: Ting-Yu Lai, Ann Arbor, MI (US); Miki Sato, Brownstown, MI (US); Bo Sun, Farmington Hills, MI (US)

(73) Assignees: DENSO International America, Inc., Southfield, MI (US); DENSO CORPORATION, Kariya, Aichi-pref. (JP)

( * ) Notice: Subject to any disclaimer, the term of this patent is extended or adjusted under 35 U.S.C. 154(b) by 15 days.

(21) Appl. No.: 15/096,400

(22) Filed: Apr. 12, 2016

(65) Prior Publication Data

US 2017/0291545 A1  Oct. 12, 2017

(51) Int. Cl.
*B60Q 1/00* (2006.01)
*B60Q 9/00* (2006.01)
*G08G 1/16* (2006.01)

(52) U.S. Cl.
CPC ............ *B60Q 9/008* (2013.01); *G08G 1/167* (2013.01)

(58) Field of Classification Search
None
See application file for complete search history.

(56) References Cited

U.S. PATENT DOCUMENTS

| | | | |
|---|---|---|---|
| 5,689,264 A | 11/1997 | Ishikawa et al. | |
| 5,781,119 A * | 7/1998 | Yamashita | G05D 1/024 180/168 |
| 5,899,953 A | 5/1999 | Urahashi | |
| 6,193,380 B1 * | 2/2001 | Jacobs | G08G 1/167 340/903 |
| 6,506,969 B1 | 1/2003 | Baron | |
| 6,560,529 B1 * | 5/2003 | Janssen | G01C 21/28 340/988 |
| 6,561,295 B1 | 5/2003 | Kuroda et al. | |
| 6,744,396 B2 | 6/2004 | Stone et al. | |
| 6,853,894 B1 | 2/2005 | Kolls | |
| 7,038,577 B2 | 5/2006 | Pawlicki et al. | |
| 7,504,986 B2 | 3/2009 | Brandt et al. | |
| 7,602,276 B2 | 10/2009 | Madau | |

(Continued)

FOREIGN PATENT DOCUMENTS

| | | |
|---|---|---|
| JP | 2013-002987 | 1/2013 |
| WO | WO 2013/081998 | 6/2013 |
| WO | WO 2014/006919 | 1/2014 |

*Primary Examiner* — Curtis King
(74) *Attorney, Agent, or Firm* — Harness, Dickey & Pierce, P.L.C.

(57) ABSTRACT

A system and method are provided and include a blind spot monitoring system with a blind spot sensor that monitors a blind spot alert area of a subject vehicle and generates an alert when a secondary vehicle is detected within the blind spot alert area of the subject vehicle. A controller receives at least one of traffic sign data and GPS data, determines whether a current lane of the subject vehicle is merging or is going to merge with a second lane, and expands the blind spot alert area in response to determining that the current lane of the subject vehicle is merging or is going to merge with the second lane.

18 Claims, 7 Drawing Sheets

(56) References Cited

U.S. PATENT DOCUMENTS

| | | |
|---|---|---|
| 7,612,658 B2 | 11/2009 | Stopczynski |
| 7,650,227 B2 | 1/2010 | Kirk et al. |
| 8,224,370 B2 | 7/2012 | Miucic |
| 8,489,284 B2 | 7/2013 | Emam et al. |
| 8,669,857 B2 | 3/2014 | Sun et al. |
| 8,775,031 B1* | 7/2014 | Bankhead ............... B60R 1/025 359/843 |
| 8,775,073 B2* | 7/2014 | Denaro ................ G01C 21/26 340/990 |
| 8,791,802 B2 | 7/2014 | Schwindt et al. |
| 2002/0057195 A1 | 5/2002 | Yamamura |
| 2002/0126002 A1 | 9/2002 | Patchell |
| 2003/0016158 A1 | 1/2003 | Stayton et al. |
| 2003/0109985 A1 | 6/2003 | Kotzin |
| 2004/0016870 A1 | 1/2004 | Pawlicki et al. |
| 2004/0119609 A1 | 6/2004 | Solomon |
| 2004/0229621 A1 | 11/2004 | Misra |
| 2005/0015203 A1* | 1/2005 | Nishira ................ G08G 1/167 701/301 |
| 2005/0033497 A1* | 2/2005 | Stopczynski ........... G01S 13/87 701/45 |
| 2005/0128061 A1* | 6/2005 | Yanai ...................... B60R 1/00 340/435 |
| 2006/0006988 A1 | 1/2006 | Harter et al. |
| 2006/0155444 A1* | 7/2006 | Lee ........................ B60R 1/025 701/49 |
| 2007/0018801 A1* | 1/2007 | Novotny ................ B60Q 9/008 340/435 |
| 2007/0159355 A1 | 7/2007 | Kelly et al. |
| 2008/0169938 A1* | 7/2008 | Madau ..................... B60R 1/00 340/901 |
| 2008/0252482 A1 | 10/2008 | Stopczynski |
| 2008/0300755 A1* | 12/2008 | Madau ..................... B60R 1/00 701/49 |
| 2009/0045928 A1 | 2/2009 | Rao et al. |
| 2009/0079553 A1 | 3/2009 | Yanagi et al. |
| 2009/0243822 A1* | 10/2009 | Hinninger ............. B60Q 9/008 340/435 |
| 2010/0045448 A1 | 2/2010 | Kakinami |
| 2010/0049393 A1* | 2/2010 | Emam ...................... G06N 5/02 701/31.4 |
| 2010/0238009 A1 | 9/2010 | Cook et al. |
| 2011/0010041 A1* | 1/2011 | Wagner ................ G01S 13/931 701/31.4 |
| 2011/0084852 A1 | 4/2011 | Szczerba |
| 2011/0187863 A1 | 8/2011 | Glander et al. |
| 2012/0116659 A1 | 5/2012 | Yuasa |
| 2012/0218124 A1 | 8/2012 | Lee et al. |
| 2012/0245832 A1* | 9/2012 | Meis ...................... G08G 1/167 701/116 |
| 2013/0018545 A1 | 1/2013 | Prakah-Asante et al. |
| 2013/0051042 A1 | 2/2013 | Nordbruch |
| 2013/0054086 A1 | 2/2013 | Lo et al. |
| 2013/0176145 A1* | 7/2013 | Yu .......................... G08G 1/162 340/905 |
| 2013/0181860 A1 | 7/2013 | Le et al. |
| 2013/0253810 A1 | 9/2013 | Miyajima et al. |
| 2013/0253811 A1 | 9/2013 | Miyajima et al. |
| 2014/0191895 A1 | 7/2014 | Binzer et al. |
| 2015/0100216 A1* | 4/2015 | Rayes ................. B60W 30/143 701/96 |
| 2015/0185319 A1 | 7/2015 | Matsuura et al. |
| 2015/0193885 A1 | 7/2015 | Akiva et al. |
| 2015/0195496 A1 | 7/2015 | Hayakawa et al. |
| 2015/0232021 A1 | 8/2015 | Downey |
| 2015/0232034 A1 | 8/2015 | Weller et al. |
| 2015/0301182 A1 | 10/2015 | Geiger et al. |
| 2015/0302586 A1 | 10/2015 | Fukata et al. |
| 2015/0331098 A1 | 11/2015 | Luebbert |
| 2016/0090043 A1* | 3/2016 | Kim ....................... B60R 1/025 701/49 |
| 2016/0101730 A1 | 4/2016 | Shehan et al. |
| 2016/0207466 A1 | 7/2016 | Lynam |
| 2016/0232790 A1 | 8/2016 | Massey et al. |
| 2017/0154523 A1* | 6/2017 | Moritani ................ G08G 1/09 |

* cited by examiner

METHODS AND SYSTEMS FOR BLIND SPOT MONITORING WITH ADAPTIVE ALERT ZONE

FIELD

The present disclosure relates to methods and systems for blind spot monitoring in a vehicle and, more particularly, blind sport monitoring that utilizes an adaptive alert zone.

BACKGROUND

This section provides background information related to the present disclosure, which is not necessarily prior art.

Although systems exist to help a driver of a vehicle locate objects, such as other vehicles, in a blind spot of the vehicle, and to generally assist with collision avoidance, such systems are subject to improvement. The present teachings advantageously provide systems and methods for blind spot monitoring and informing a driver that an object, such as another vehicle, is in a blind spot of the vehicle. The present teachings provide for improved collision avoidance systems and methods as well.

SUMMARY

This section provides a general summary of the disclosure, and is not a comprehensive disclosure of its full scope or all of its features.

The present teachings include systems and methods with a blind spot monitoring system including a blind spot sensor that monitors a blind spot alert area of a subject vehicle and generates an alert when a secondary vehicle is detected within the blind spot alert area of the subject vehicle. A controller receives at least one of traffic sign data and GPS data, determines whether a current lane of the subject vehicle is merging or is going to merge with a second lane, and expands the blind spot alert area in response to determining that the current lane of the subject vehicle is merging or is going to merge with the second lane.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of select embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
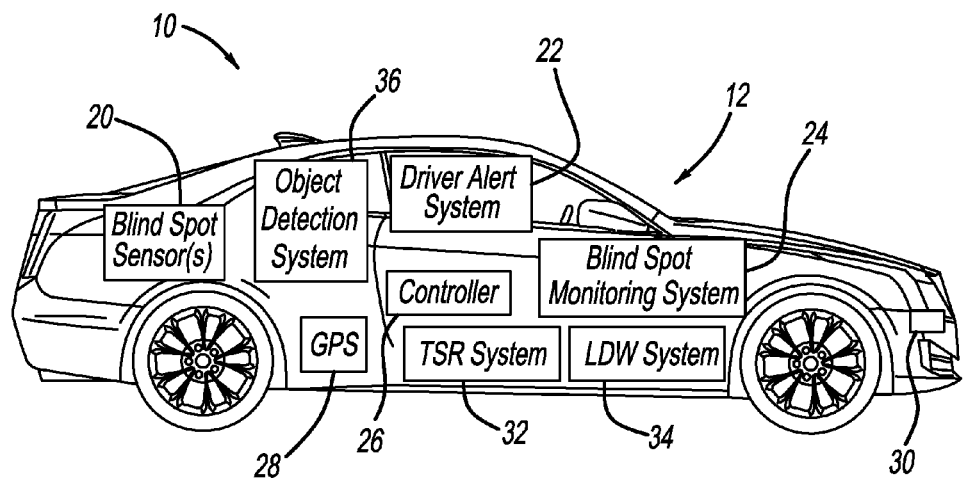
FIG. 1 illustrates a subject vehicle including a blind spot monitoring system according to the present teachings for informing a driver of the subject vehicle that an object is in a blind spot of the subject vehicle.

With reference to FIG. 1, a vehicle 10 including a system 12 according to the present teachings is illustrated. Although the vehicle 10 is illustrated as an automobile in FIG. 1, the present teachings apply to any other suitable vehicle, such as a sport utility vehicle (SUV), a mass transit vehicle (such as a bus), or a military vehicle, as examples. The system 12 is configured to inform a driver of the vehicle 10 (often referred to as the subject vehicle) that an object, such as a secondary vehicle, is in a blind spot alert area of the subject vehicle 10. The system 12 generally includes one or more blind spot sensors 20, a driver alert system 22, a blind spot monitoring system 24, a controller 26, a global positioning system (GPS) 28, a front-facing camera 30, a traffic sign recognition (TSR) system 32, a lane departure warning (LDW) system 34, and an object detection system 36. The controller 26 can be any suitable controller for monitoring or controlling one or more of the blind spot sensors 20, the driver alert system 22, the blind spot monitoring system 24, the GPS 28, the front-facing camera 30, the TSR system 32, the LDW system 34, and/or the object detection system 36. In this application, including the definitions below, the terms "controller" and "system" may refer to, be part of, or include processor hardware (shared, dedicated, or group) that executes code and memory hardware (shared, dedicated, or group) that stores code executed by the processor hardware. The code is configured to provide the features of the controller and systems described herein.

The blind spot sensors 20 include one or more sensors configured to identify objects, such as other vehicles, in a blind spot alert area of the subject vehicle 10. The blind spot sensors 20 can include any suitable sensors, such as any suitable radar, camera, ultrasonic, or other suitable sensors for detecting objects in a blind spot alert area of the subject vehicle 10. The blind spot sensors 20 can be mounted at any suitable position on the vehicle 10, such as near the back corners of the subject vehicle 10 or along the sides of the subject vehicle 10.

With reference to FIGS. 2-5, and as discussed in further detail below, the system 12 is configured to expand the blind spot alert area based on monitored or received surrounding object information, traffic information, and/or road information.

Figure 2:
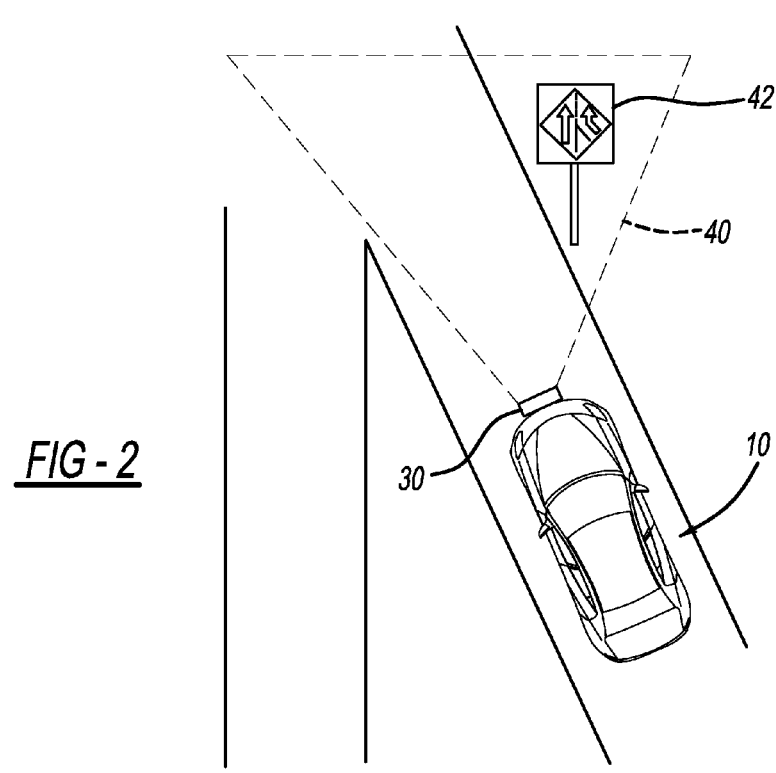
FIG. 2 illustrates the subject vehicle detecting a traffic sign.
Figure 3:
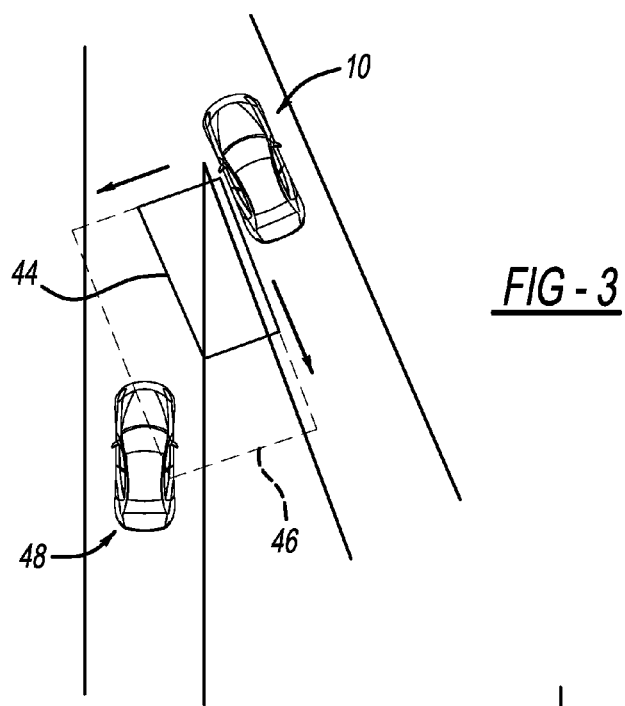
FIG. 3 illustrates the subject vehicle, a secondary vehicle, an initial blind spot alert area, and an expanded blind spot alert area.

For example, with reference to FIGS. 2 and 3, the system 12 can determine that the subject vehicle 10 is about to merge onto a highway and can expand the blind spot alert area. In this way, the system 12 can detect and alert the driver to any faster moving secondary vehicles 48 already traveling on the highway that may enter the expanded blind spot alert area of the subject vehicle 10. In prior systems utilizing a static blind spot alert area, the faster moving secondary vehicle 48 may enter the static blind spot area too late for the driver to be alerted and to react in sufficient time to avoid a collision. In the system 12 of the present teachings, however, when the subject vehicle 10 is entering or merging onto a highway, the system 12 expands the blind spot alert area and can provide an earlier alert to the driver of the subject vehicle 10 so that the driver has more time to avoid a collision.

With reference to FIGS. 1 and 2, the TSR system 32 of the subject vehicle 10 can utilize the front-facing camera 30 to monitor a scan area 40 for traffic signs 42. When a traffic sign 42 is detected, the TSR system 32 can analyze the traffic sign 42 and determine whether the traffic sign indicates an upcoming traffic merge. For example, the TSR system 32 can determine whether the traffic sign indicates that the current lane of the subject vehicle 10 is about to merge with another lane, such as a highway lane.

In addition to, or as an alternative to, the TSR system 32, the system 12 can use the GPS 28 to determine an upcoming traffic merge. For example, the system 12 can analyze GPS map and traffic data and a current location and trajectory path of the subject vehicle 10 and determine that the current lane of the subject vehicle 10 is about to merge with another lane, such as a highway lane.

With reference to FIGS. 1 and 3, when the system 12 determines an upcoming merge, the system 12 can expand the blind spot alert area from an initial blind spot alert area 44 to an expanded blind spot alert area 46. In this way, as shown in FIG. 3, the system 12 can detect a potentially faster moving secondary vehicle 48 already traveling in the destination lane and provide an alert to the driver of the subject vehicle 10. As shown in FIG. 3, the secondary vehicle 48 is positioned within the expanded blind spot alert area 46, but is not positioned within the initial blind spot alert area 44. As such, the system 12 can more quickly detect the potentially faster moving secondary vehicle 48 positioned in the expanded blind spot alert area 46 and provide an earlier alert to the driver of the subject vehicle 10. In this way, a potential collision with the faster moving secondary vehicle 48 in the destination lane may be avoided.

Figure 4:
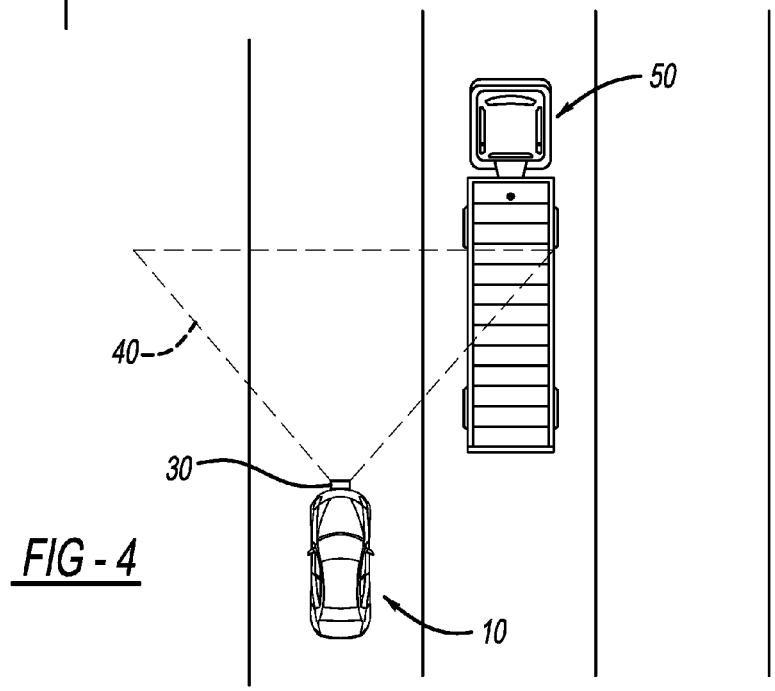
FIG. 4 illustrates the subject vehicle detecting a long secondary vehicle.
Figure 5:
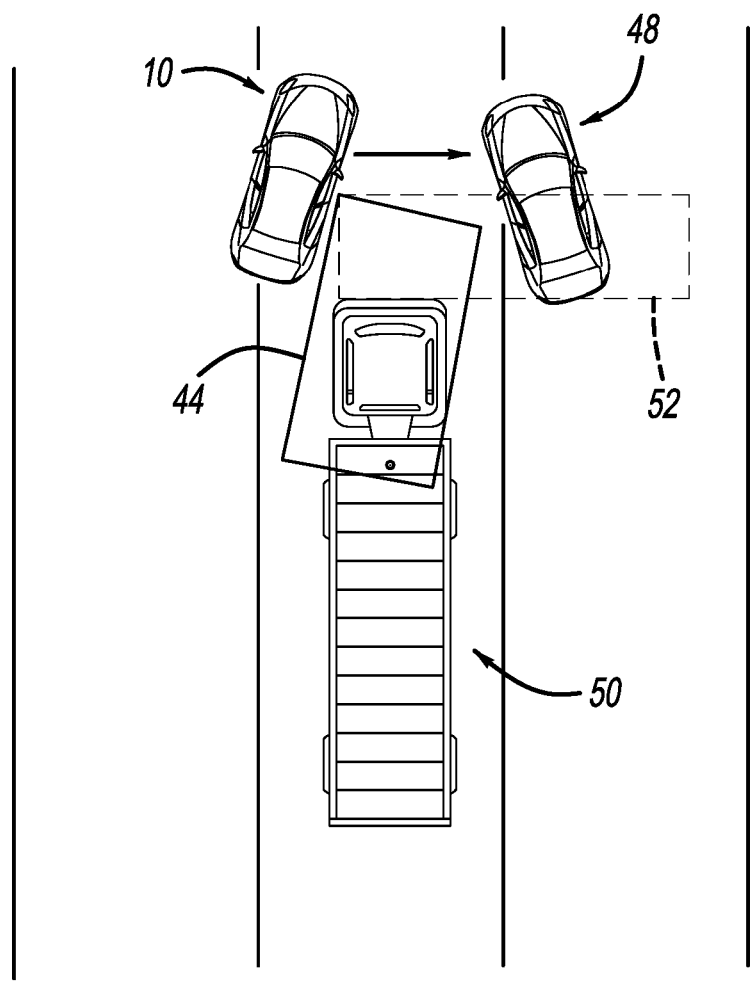
FIG. 5 illustrates the subject vehicle, the long secondary vehicle, an additional secondary vehicle, an initial blind spot alert area, and an expanded blind spot alert area.

In addition, with reference to FIGS. 1, 4, and 5, the system 12 can determine that the subject vehicle 10 is traveling alongside a long vehicle 50, such as a truck or a vehicle towing a trailer, and can expand the blind spot alert area once the subject vehicle 10 has passed the long vehicle 50 to detect a secondary vehicle 48 that may also be merging into the lane of the long vehicle 50. The object detection system 36 can utilize the front-facing camera 30 to monitor a scan area 40 for long vehicles 50 alongside the subject vehicle 10. The system 12 can then monitor a location of the subject vehicle relative to the long vehicle 50. When the subject vehicle 10 has passed a front edge of the long vehicle 50, the system 12 can expand the blind spot alert area from the initial blind spot alert area 44 to an expanded blind spot alert area 52. In this way, as shown in FIG. 5, the system 12 can detect a secondary vehicle 48 traveling in a lane on the opposite side of the long vehicle 50. As shown in FIG. 5, the secondary vehicle 48 is positioned within the expanded blind spot alert area 52, but is not positioned within the initial blind spot alert area 44. As such, the system 12 can detect a secondary vehicle 48 positioned on the other side of the long vehicle 50 that may potentially be merging into the lane of the long vehicle 50 and can provide an alert to the driver of the subject vehicle 10. In this way, a potential collision due to the subject vehicle 10 and the secondary vehicle 48 merging into the same lane at the same time, ahead of the long vehicle 50, can be avoided.

With reference to FIGS. 1-5, the driver alert system 22 is configured to alert the driver of the subject vehicle 10 to the presence of the secondary vehicle 48 within a blind spot alert area, such as the initial blind spot alert area 44 or the expanded blind spot alert areas 46, 52 of the subject vehicle 10. The driver alert system 22 can be configured to provide any suitable alert to the driver of the subject vehicle 10 indicating the presence of the secondary vehicle 48 within the blind spot alert area of the subject vehicle. For example, the driver alert system 22 can be configured to provide any suitable visual alert, audible alert, and/or haptic feedback alert. For example, the visual alert can be displayed to the driver on a heads-up display of the subject vehicle 10, on a center stack display of the subject vehicle 10, at the instrument cluster of the subject vehicle 10, etc. The audible alert can be any suitable alert tone, voice alert, etc. The haptic feedback alert can be provided in any suitable manner. For example, the haptic feedback alert can be provided at the steering wheel and/or the driver's seat.

Additionally, the driver alert system 22 can alert the driver of the subject vehicle 10 to a location of the secondary vehicle 48, relative to the subject vehicle 10. For example, the driver alert system 22 can alert the driver of the subject vehicle 10 that the secondary vehicle 48 is approaching from the rear side, the left side, or the right side of the subject vehicle 10. For example, with reference to FIG. 3, the driver alert system 22 can alert the driver of the subject vehicle 10 that the secondary vehicle 48 is approaching the subject vehicle 10 from the rear of the subject vehicle 10. For further example, with reference to FIG. 5, the driver alert system 22 can alert the driver of the subject vehicle 10 that the secondary vehicle 48 is approaching from the subject vehicle 10 from the right side of the subject vehicle 10.

Figure 6:
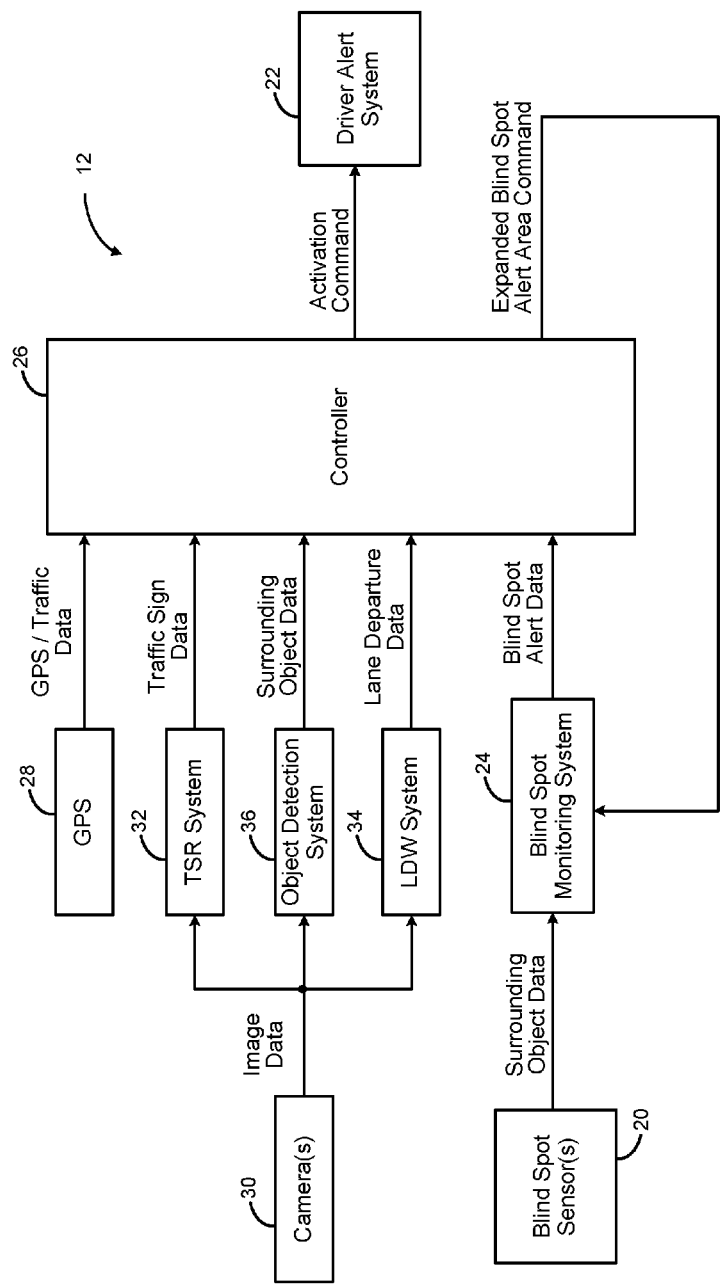
FIG. 6 illustrates a block diagram of a system according to the present teachings for expanding a blind spot alert area of a blind spot monitoring system.

With reference to FIG. 6, a block diagram of a system 12 according to the present teachings for expanding a blind spot alert area of the blind spot monitoring system 24 is shown. The system 12 includes the blind spot monitoring system 24, which receives surrounding object data from the blind spot sensor(s) 20 and generates blind spot alert data that is communicated to the controller 26. The blind spot alert data, for example, can include data indicating whether a secondary vehicle 48 is present in the blind spot alert area of the subject vehicle 10 and data indicating a location of the secondary vehicle 48 relative to the subject vehicle 10.

The controller 26 can also receive GPS/traffic data from the GPS 28. For example, the controller 26 can receive GPS data, including a current location of the subject vehicle 10 and map data of the area surrounding the subject vehicle 10. As discussed above, based on the current location of the subject vehicle 10 and the map data, the controller 26 can determine the trajectory path of the subject vehicle 10 and whether the current lane of the subject vehicle 10 is about to merge with another lane, such as a highway lane.

The controller 26 can receive traffic sign data from a TSR system 32. As described above, the TSR system 32 can receive image data from the front-facing camera 30 and can monitor a scan area 40 for traffic signs 42. The TSR system 32 can then analyze the traffic sign 42 and determine whether the traffic sign indicates an upcoming traffic merge.

The controller 26 can receive surrounding object data from an object detection system 36. As described above, the object detection system 36 can receive image data from the front-facing camera 30 and can monitor a scan area 40 for long vehicles 50 alongside the subject vehicle 10. The system 12 can then monitor a location of the subject vehicle 10 relative to the long vehicle 50.

The controller 26 can also receive lane departure data from the LDW system 34. The LDW system 34 can receive image data from the front-facing camera 30, or from other cameras installed on the subject vehicle 10, and can monitor lane lines surrounding the subject vehicle 10 to determine when the subject vehicle 10 is crossing over one or more lane lines. As described in further detail below, the controller 26 can receive lane departure data from the LDW system 34 and can expand the blind spot alert area in response to the subject vehicle 10 crossing two lanes at once.

Based on the GPS/traffic data, the traffic sign data, the surrounding object data, and the lane departure data, the controller 26 can output an expanded blind spot alert area command to the blind spot monitoring system 24. The blind spot monitoring system 24 can then appropriately expand the blind spot alert area and monitor the expanded blind spot alert area 46, 52 for secondary vehicles 48. The blind spot monitoring system 24 can then generate blind spot alert data when a secondary vehicle 48 is detected in the expanded blind spot alert area 46, 52.

Additionally, based on the blind spot alert data, the controller 26 can output an activation command to the driver alert system 22 to alert the driver of the subject vehicle 10 to the presence of a secondary vehicle 48 in the blind spot alert area of the subject vehicle 10. The activation command may include location data indicating a location of the secondary vehicle 48 relative to the subject vehicle 10.

Figure 7:
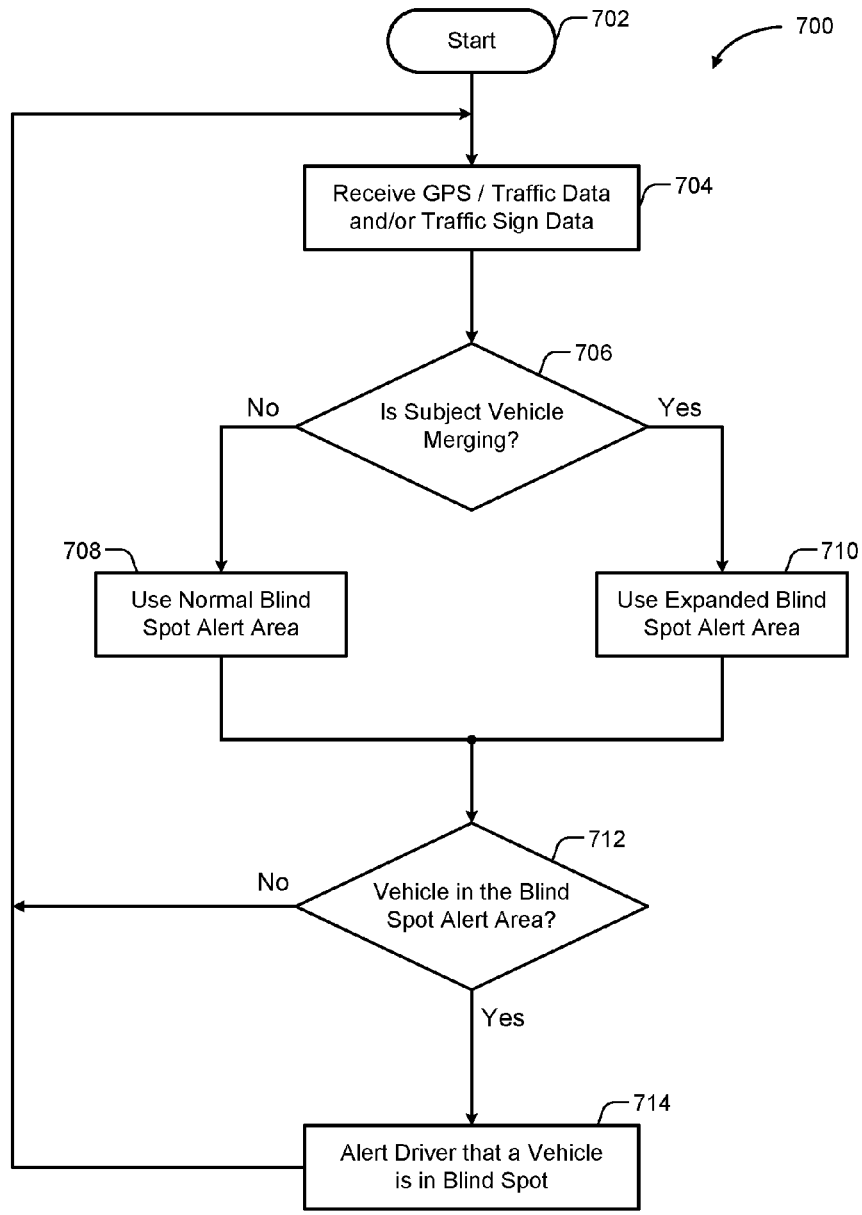
FIG. 7 illustrates a flow diagram for a method according to the present teachings for expanding a blind spot alert area of a blind spot monitoring system.

With reference to FIG. 7, a flowchart for a method 700 is shown. The method 700 is configured to detect a secondary vehicle 48 in a blind spot alert area of a subject vehicle 10, using either a normal or initial blind spot alert area 44 or an expanded blind spot alert area 46, as shown in FIG. 3. The method 700 can be performed by the controller 26 or any other suitable control or processing device. The method starts at 702.

At 704, the controller 26 receives GPS/traffic data from the GPS 28 and/or traffic sign data from the TSR system 32. For example, as discussed above, the TSR system 32 can monitor a scan area 40 for traffic signs 42 and, when a traffic sign 42 is detected, analyze the traffic sign 42 to determine whether the traffic sign 42 indicates an upcoming traffic merge. As further discussed above, in addition to or as an alternative to the TSR system 32, the GPS 28 can also be used to determine an upcoming traffic merge. For example, the controller 26 can analyze GPS map data and a current location and trajectory path of the subject vehicle 10 and determine whether the current lane of the subject vehicle 10 is about to merge with another lane, such as a highway lane.

At 706, the controller determines whether the subject vehicle 10 is merging or about to merge into another lane of traffic. At 706, when the subject vehicle 10 is not merging or about to merge into another lane of traffic, the controller 26 proceeds to 708 and uses the normal or initial blind spot alert area 44, shown in FIG. 3, for example. At 706, when the subject vehicle 10 is determined by the controller 26 to be merging or about to merge into another lane of traffic, the controller 26 proceeds to 710 and uses the expanded blind spot alert area 46. In either case, the controller 26 then proceeds to 712.

At 712, the controller 26 determines whether a secondary vehicle 48 is located in the blind spot alert area of the subject vehicle 10, as previously set at steps 708 or 710. At 712, when a secondary vehicle 48 is not present in the blind spot alert area of the subject vehicle 10, the controller 26 loops back to 704 and repeats the method 700.

At 712, when the controller 26 determines that a secondary vehicle 48 is present in the blind spot alert area of the subject vehicle 10, the controller 26 alerts the driver that a secondary vehicle 48 is in the blind spot alert area of the subject vehicle 10 using the driver alert system 22. The controller 26 then loops back to 704 and repeats the method 700.

Figure 8:
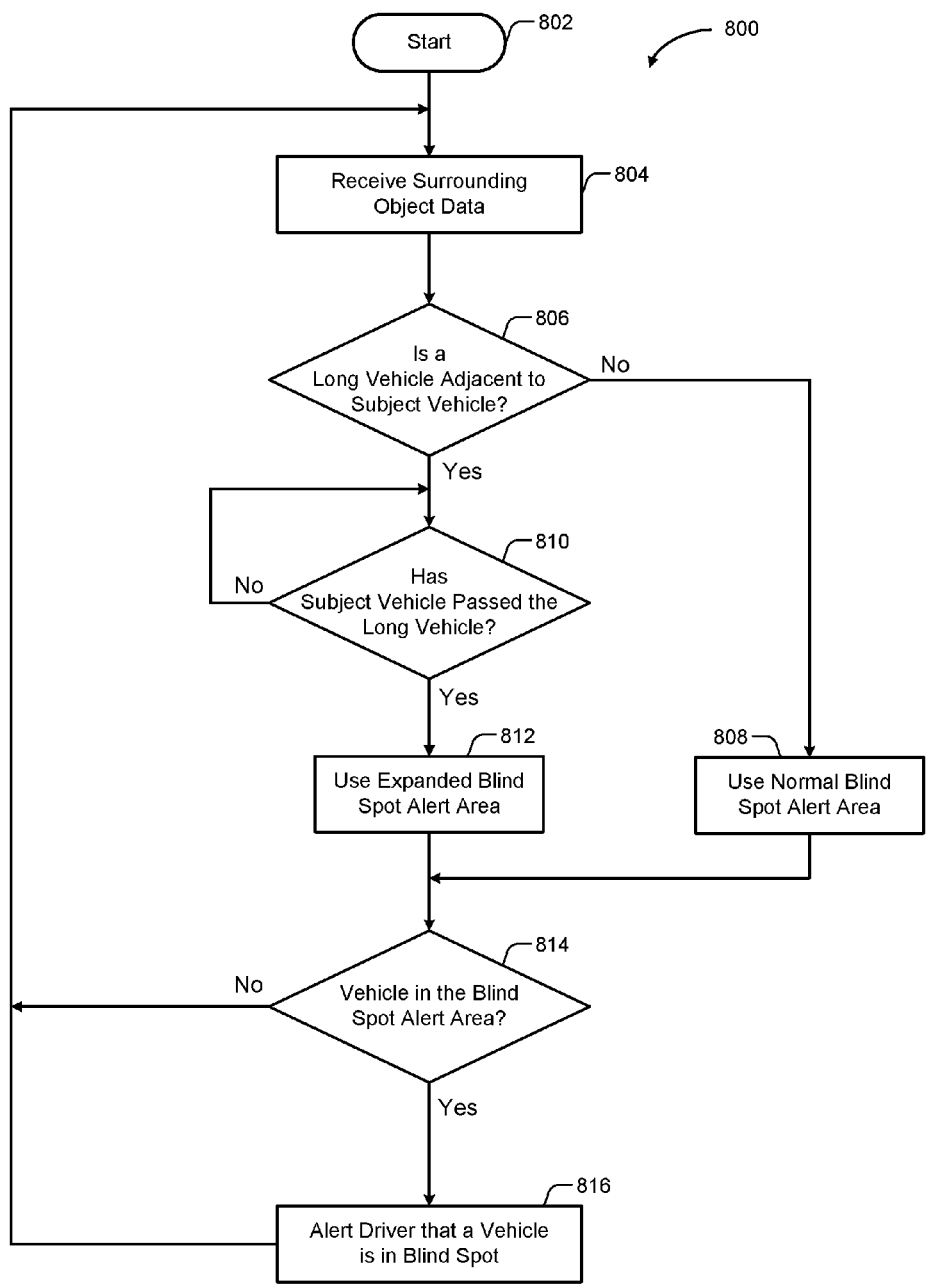
FIG. 8 illustrates a flow diagram for another method according to the present teachings for expanding a blind spot alert area of a blind spot monitoring system.

With reference to FIG. 8, a flowchart for a method 800 is shown. The method 800 is configured to detect a secondary vehicle 48 in a blind spot alert area of a subject vehicle 10, using either a normal or initial blind spot alert area 44 or an expanded blind spot alert area 52, as shown in FIG. 5. The method 700 can be performed by the controller 26 or any other suitable control or processing device. The method starts at 802.

At 804, the controller 26 receives surrounding object data from the object detection system 36. For example, as discussed above with reference to FIGS. 4 and 5, the object detection system 36 can utilize the front-facing camera 30 to monitor a scan area 40 for long vehicles 50 alongside the subject vehicle 10.

At 806, the controller 26 determines whether a long vehicle 50, such as a truck or vehicle towing a trailer, is adjacent to the subject vehicle 10. For example, the object detection system 36 or the controller 26 can detect a length of a vehicle adjacent to the subject vehicle 10, and compare the detected length to a predetermined length threshold.

At 806, when a long vehicle is not adjacent to the subject vehicle 10, the controller 26 proceeds to 808 and uses the normal or initial blind spot alert area 44, shown in FIG. 5, for example.

At 806, when a long vehicle is adjacent to the subject vehicle 10, the controller 26 proceeds to 810. At 810, the controller 26 determines whether subject vehicle 10 has passed the long vehicle 50 based on surrounding object data received from the object detection system 36. When the subject vehicle 10 has not passed the long vehicle 50, the controller 26 loops back to 810 and continues to check whether the subject vehicle 10 has passed the long vehicle 50. At 810, when the subject vehicle 10 has passed the long vehicle 50, the controller 26 proceeds to 812 and uses the expanded blind spot alert area 52, shown in FIG. 5. After both 808 or 812, the controller then proceeds to 814.

At 814, the controller 26 determines whether a secondary vehicle 48 is located in the blind spot alert area of the subject vehicle 10, as previously set at steps 808 and 812. At 814, when a secondary vehicle 48 is not present in the blind spot alert area of the subject vehicle 10, the controller 26 loops back to 804 and repeats the method 800.

At 814, when the controller 26 determines that a secondary vehicle 48 is present in the blind spot alert area of the subject vehicle 10, the controller 26 alerts the driver that a secondary vehicle 48 is in the blind spot alert area of the subject vehicle 10 using the driver alert system 22. The controller 26 then loops back to 804 and repeats the method 800.

Figure 9:
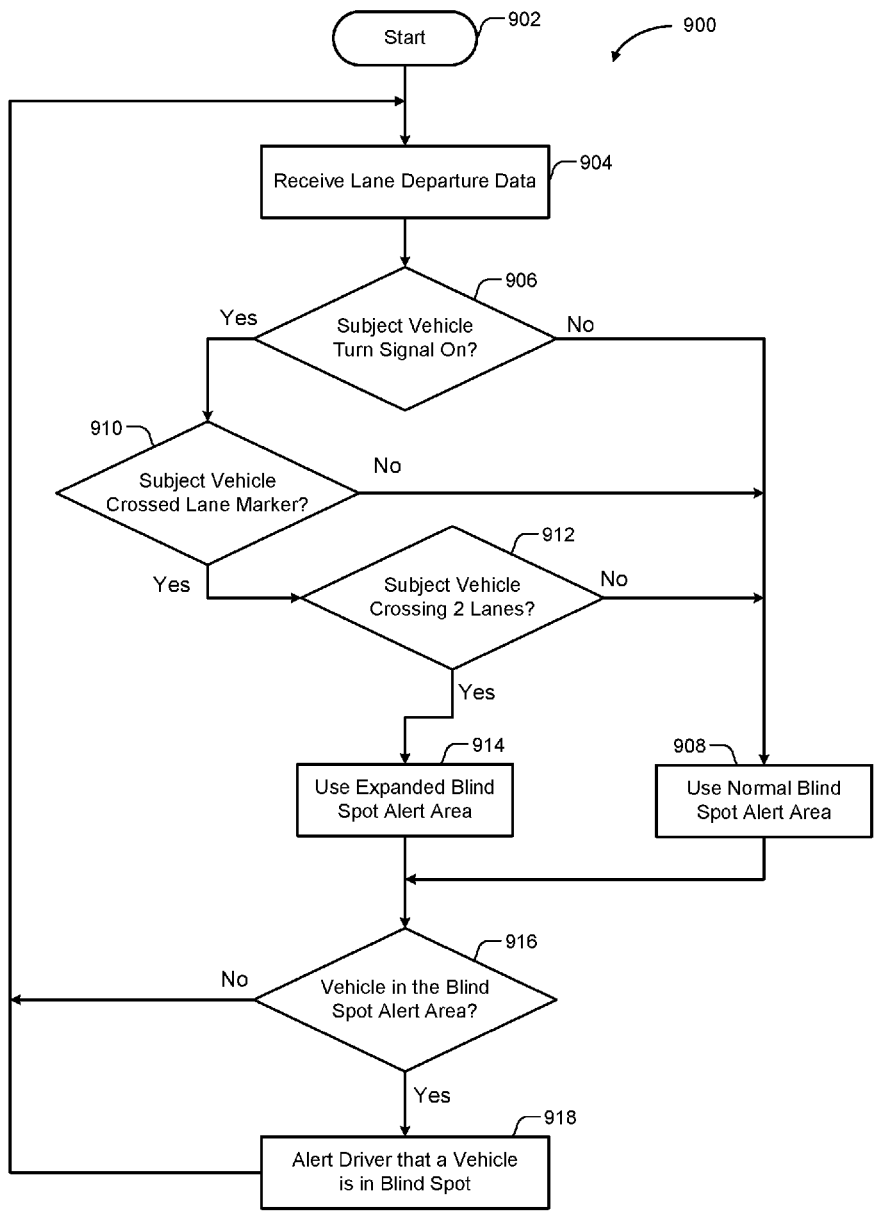
FIG. 9 illustrates a flow diagram for another method according to the present teachings for expanding a blind spot alert area of a blind spot monitoring system.

With reference to FIG. 9, a flowchart for a method 900 is shown. The method 900 is configured to detect a secondary vehicle 48 in a blind spot alert area of a subject vehicle 10, using either a normal or initial blind spot alert area 44 or an expanded blind spot alert area 46, as shown in FIG. 3. The method 900 can be performed by the controller 26 or any other suitable control or processing device. The method starts at 902.

At 904, the controller 26 receives lane departure data from the LDW system 34. As described above, the LDW system 34 can receive image data from the front-facing camera 30, or from other cameras installed on the subject vehicle 10, and can monitor lane lines surrounding the subject vehicle 10 to determine when the subject vehicle 10 is crossing over one or more lane lines.

At 906, the controller 26 determines whether a turn signal of the subject vehicle 10 is currently activated. At 906, when a turn signal is not currently activated, the controller 26 proceeds to 908 and uses the normal or initial blind spot alert area 44, shown in FIG. 3, for example.

At 906, when the controller 26 determines that a turn signal is currently activated, the controller 26 proceeds to 910.

At 910, the controller 26 determines whether the subject vehicle 10 has crossed a lane marker line yet based on lane departure data from the LDW system 34. At 910, when the subject vehicle 10 has not yet crossed a lane marker line yet, the controller 26 proceeds to 908 and uses the normal or initial blind spot alert area 44, shown in FIG. 3.

At 910, when the controller determines that the subject vehicle 10 has crossed a lane marker line, the controller 26 proceeds to 912.

At 912, the controller 26 determines whether the subject vehicle 10 is attempting to cross two lanes at once, based on lane departure data from the LDW system 34. At 912, when the controller 26 determines that the subject vehicle 10 is not attempting to cross two lanes at once, the controller 26 proceeds to 908 and uses the normal or initial blind spot alert area 44, shown in FIG. 3.

At 912, when the controller 26 determines that the subject vehicle 10 is attempting to cross two lanes at once, based on lane departure data from the LDW system 34, the controller 26 proceeds to 914 and uses the expanded blind spot alert area 46, shown in FIG. 3. After both 908 and 914, the controller 26 then proceeds to 916.

At 916, the controller 26 determines whether a secondary vehicle 48 is located in the blind spot alert area of the subject vehicle 10, as previously set at steps 908 or 914. At 916, when a secondary vehicle 48 is not present in the blind spot alert area of the subject vehicle 10, the controller 26 loops back to 904 and repeats the method 900.

At 916, when the controller 26 determines that a secondary vehicle 48 is present in the blind spot alert area of the subject vehicle 10, the controller 26 alerts the driver that a secondary vehicle 48 is in the blind spot alert area of the subject vehicle 10 using the driver alert system 22. The controller 26 then loops back to 904 and repeats the method 900.

In this way, the present teachings provide a blind spot monitoring system 24 with adaptive blind spot alert areas to warn the driver of a subject vehicle 10 of approaching vehicles earlier than in previous systems.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail.

The terminology used is for the purpose of describing particular example embodiments only and is not intended to be limiting. The singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). The term "and/or" includes any and all combinations of one or more of the associated listed items.

Although the terms first, second, third, etc. may be used to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system comprising:
a blind spot monitoring system including a blind spot sensor that monitors a blind spot alert area of a subject vehicle and generates an alert when a secondary vehicle is detected within the blind spot alert area of the subject vehicle;
a controller that receives at least one of traffic sign data and GPS data, that determines whether a current lane of the subject vehicle is merging or is going to merge with a second lane, and that expands the blind spot alert area from an initial blind spot alert area having a first area to an expanded blind spot alert area having a second area in response to determining that the current lane of the subject vehicle is merging or is going to merge with the second lane, the second area being greater than the first area.

2. The system of claim 1, further comprising:
a traffic sign recognition system that detects a traffic sign with a camera of the subject vehicle, that determines whether the traffic sign indicates a traffic merge, and that outputs the traffic sign data based on whether the traffic sign indicates the traffic merge;
wherein the controller receives the traffic sign data from the traffic sign recognition system and determines whether the current lane of the subject vehicle is merging or is going to merge with the second lane based on the traffic sign data.

3. The system of claim 2, wherein the camera generates image data corresponding to the traffic sign and wherein the traffic sign recognition system analyzes the image data to determine whether the traffic sign indicates the traffic merge.

4. The system of claim 1, further comprising:
a global positioning system that determines a location of the subject vehicle and that receives map data for the location of the subject vehicle;
wherein the controller receives the map data and the location of the subject vehicle and determines whether the current lane of the subject vehicle is merging or is going to merge with the second lane based on the GPS data.

5. The system of claim 4, wherein the controller analyzes the location of the subject vehicle and the map data for the location of the subject vehicle, determines a trajectory path of the subject vehicle, and determines whether the current lane of the subject vehicle is merging or is going to merge with the second lane based on the trajectory path of the subject vehicle.

6. The system of claim 1 wherein the blind spot sensor includes at least one of a radar sensor, a camera, and an ultrasonic sensor.

7. The system of claim 1, wherein the alert includes at least one of a visual alert, an audible alert, and a haptic alert to a driver of the subject vehicle.

8. The system of claim 1, wherein the alert indicates a location of the secondary vehicle relative to the subject vehicle.

9. The system of claim 1, wherein the expanded blind spot alert area includes all of the initial blind spot alert area.

10. A method comprising:
monitoring a blind spot alert area of a subject vehicle with a blind spot monitoring system including a blind spot sensor;
generating, with the blind spot monitoring system, an alert when a secondary vehicle is detected within the blind spot alert area of the subject vehicle;
receiving, with a controller, at least one of traffic sign data and GPS data;
determining, with the controller, whether a current lane of the subject vehicle is merging or is going to merge with a second lane;
expanding, with the controller, the blind spot alert area from an initial blind spot alert area having a first area to an expanded blind spot alert area having a second area in response to determining that the current lane of the subject vehicle is merging or is going to merge with the second lane, the second area being greater than the first area.

11. The method of claim 10, further comprising:
detecting, with a traffic sign recognition system, a traffic sign using a camera of the subject vehicle;
determining, with the traffic sign recognition system, whether the traffic sign indicates a traffic merge;
outputting, with the traffic sign recognition system, the traffic sign data indicating whether the traffic sign indicates the traffic merge;
wherein the controller receives the traffic sign data from the traffic sign recognition system and determines whether the current lane of the subject vehicle is merging or is going to merge with the second lane based on the traffic sign data.

12. The method of claim 11, further comprising:
generating, with the camera, image data corresponding to the traffic sign; and
analyzing, with the traffic sign recognition system, the image data to determine whether the traffic sign indicates the traffic merge.

13. The method of claim 10, further comprising:
determining, with a global positioning system, a location of the subject vehicle; and
receiving, with the global positioning system, map data for the location of the subject vehicle;
wherein the controller receives the map data and the location of the subject vehicle and determines whether the current lane of the subject vehicle is merging or is going to merge with the second lane based on the GPS data.

14. The method of claim 13, further comprising:
analyzing, with the controller, the location of the subject vehicle and the map data for the location of the subject vehicle;
determining, with the controller, a trajectory path of the subject vehicle; and
determining, with the controller, whether the current lane of the subject vehicle is merging or is going to merge with the second lane based on the trajectory path of the subject vehicle.

15. The method of claim 10 wherein the blind spot sensor includes at least one of a radar sensor, a camera, and an ultrasonic sensor.

16. The method of claim 10, wherein generating the alert includes generating at least one of a visual alert, an audible alert, and a haptic alert to a driver of the subject vehicle.

17. The method of claim 10, wherein the alert indicates a location of the secondary vehicle relative to the subject vehicle.

18. The method of claim 10, wherein the expanded blind spot alert area includes all of the initial blind spot alert area.

* * * * *